(12) United States Patent
Choi

(10) Patent No.: US 11,416,724 B2
(45) Date of Patent: Aug. 16, 2022

(54) TONER SUPPLY CONTROL IN IMAGE FORMING APPARATUS BY USING LINEAR REGRESSION ANALYSIS

(71) Applicant: Hewlett-Packard Development Company, L.P., Spring, TX (US)

(72) Inventor: Hongchul Choi, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/284,042

(22) PCT Filed: Sep. 3, 2019

(86) PCT No.: PCT/US2019/049305
§ 371 (c)(1),
(2) Date: Apr. 9, 2021

(87) PCT Pub. No.: WO2020/185253
PCT Pub. Date: Sep. 17, 2020

(65) Prior Publication Data
US 2021/0397915 A1 Dec. 23, 2021

(30) Foreign Application Priority Data
Mar. 8, 2019 (KR) .................. 10-2019-0026615

(51) Int. Cl.
*G06F 3/12* (2006.01)
*G06K 15/00* (2006.01)
(Continued)

(52) U.S. Cl.
CPC ..... *G06K 15/4075* (2013.01); *G03G 15/0856* (2013.01); *G06K 15/12* (2013.01); *G06K 15/408* (2013.01)

(58) Field of Classification Search
CPC .. G06K 15/4075; G06K 15/12; G06K 15/408; G03G 15/0856
See application file for complete search history.

(56) References Cited

U.S. PATENT DOCUMENTS

| | | | |
|---|---|---|---|
| 9,250,568 B1* | 2/2016 | Takenaka | G03G 15/0856 |
| 2009/0226194 A1* | 9/2009 | Mitamura | G03G 15/0877 |
| | | | 399/30 |

(Continued)

FOREIGN PATENT DOCUMENTS

| | | |
|---|---|---|
| CN | 109388047 A | 2/2019 |
| JP | 6-3962 A | 1/1994 |

(Continued)

*Primary Examiner* — Huo Long Chen
(74) *Attorney, Agent, or Firm* — Jefferson IP Law, LLP

(57) ABSTRACT

An example operation method of an image forming apparatus includes obtaining, through a sensor in the image forming apparatus, toner data corresponding to an amount of toner remaining in a developing apparatus, obtaining, based on the toner data in every predetermined period, a linear prediction model predicting the amount of toner remaining in the developing apparatus according to a time at which the toner is supplied to the developing apparatus, predicting, based on the linear prediction model, an expected supply time required for the amount of toner remaining in the developing apparatus to reach a target level, and controlling an operation of supplying the toner to the developing apparatus according to a result of comparing the expected supply time with a predetermined reference supply time.

20 Claims, 10 Drawing Sheets

(51) Int. Cl.
 *G03G 15/08* (2006.01)
 *G06K 15/12* (2006.01)

(56) References Cited

U.S. PATENT DOCUMENTS

| | | | | |
|---|---|---|---|---|
| 2015/0003847 A1* | 1/2015 | Yang | ................... | G03G 15/556 |
| | | | | 399/27 |
| 2015/0346667 A1* | 12/2015 | Shibata | ................ | G03G 15/556 |
| | | | | 399/53 |
| 2020/0026522 A1* | 1/2020 | Su | ........................ | G06F 9/3887 |
| 2020/0134407 A1* | 4/2020 | Shinagawa | ........ | G06K 15/4075 |

FOREIGN PATENT DOCUMENTS

| | | | |
|---|---|---|---|
| JP | 2000-214673 A | | 8/2000 |
| JP | 2007-25106 A | | 2/2007 |
| JP | 3943938 B2 | | 7/2007 |
| JP | 2016-218129 A | | 12/2016 |
| JP | 2017-37100 A | | 2/2017 |
| KR | 10-2005-0111976 A | | 11/2005 |

\* cited by examiner

| CHECK TIME POINT | REFERENCE SUPPLY TIME |
|---|---|
| 30 SECONDS | 720 SECONDS |
| 60 SECONDS | 480 SECONDS |
| 90 SECONDS | 300 SECONDS |
| 120 SECONDS | 180 SECONDS |
| 150 SECONDS | 150 SECONDS |

TONER SUPPLY CONTROL IN IMAGE FORMING APPARATUS BY USING LINEAR REGRESSION ANALYSIS

BACKGROUND

An image forming apparatus using an electrophotographic method supplies toner to an electrostatic latent image formed on a photoconductor to form a visible toner image on the photoconductor and transfers the toner image through an intermediate transfer medium or directly to a print medium. The transferred toner image is also fixed on the print medium.

The image forming apparatus uses the toner to print the toner image on the print medium. Because the toner is used each time an image forming operation is performed, the toner is exhausted when it is used for a predetermined period of time or more. In this case, a component storing the toner may be exchanged, or the toner may be refilled to the component storing the toner.

BRIEF DESCRIPTION OF DRAWINGS

Certain examples of the disclosure will be more apparent from the following description taken in conjunction with the accompanying drawings, in which:

FIG. 8 is a diagram for explaining a reference time corresponding to a predetermined period, according to an example;

DETAILED DESCRIPTION OF EXAMPLES

An image forming apparatus described herein may be any type of apparatus capable of performing an image forming operation, such as a printer, a copier, a scanner, a fax machine, a multi-function printer (MFP), or a display apparatus. The image forming operation may be at least one operation of printing, copying, scanning, and faxing.

Examples are described herein with reference to the accompanying drawings such that the disclosure may be easily performed by one of ordinary skill in the art to which the disclosure pertains. The disclosure may, however, be embodied in many different forms and should not be construed as being limited to the examples set forth herein.

Figure 1:
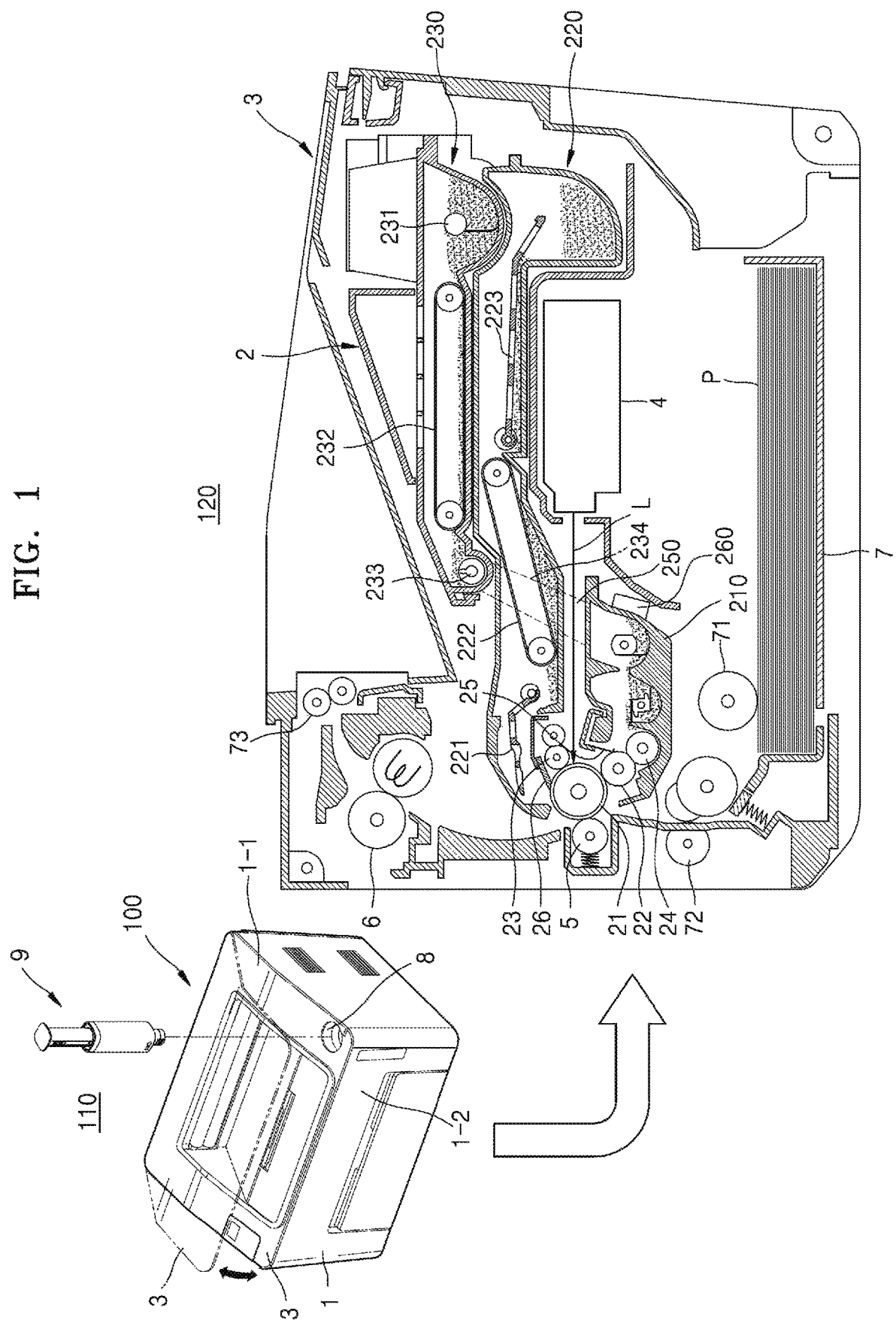
FIG. 1 is an external perspective view and an internal structure diagram of an image forming apparatus, according to an example.
Figure 2:
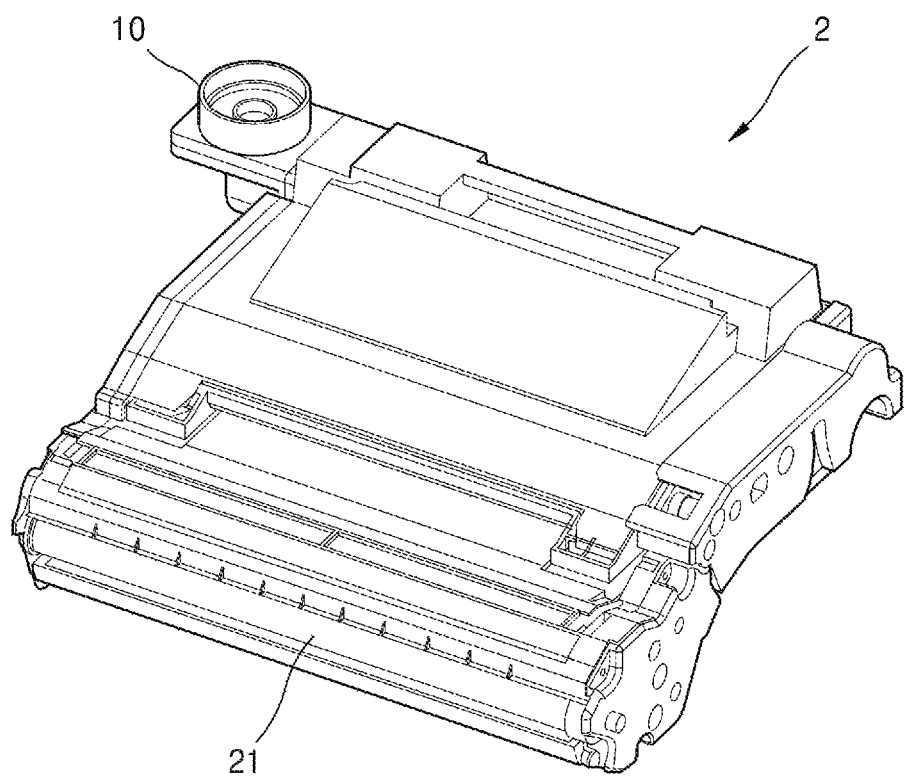
FIG. 2 is a perspective view of a development cartridge in an image forming apparatus, according to an example.

FIG. 1 is an external perspective view and an internal structure diagram of an image forming apparatus, according to an example. FIG. 2 is a perspective view of a development cartridge in an image forming apparatus, according to an example.

Referring to FIGS. 1 and 2, an image forming apparatus 100 may include a main body 1 and a development cartridge 2 detachable from the main body 1. The main body 1 may be provided with a door 3. The door 3 may open and close a part of the main body 1. Although the door 3 opening an upper portion of the main body 1 is shown in an external perspective view 110 of FIG. 1, a door which opens a side portion or the entirety of the main body 1 may be employed if necessary. A user may open the door 3 and attach or detach the development cartridge 2 to or from the main body 1. The main body 1 may be provided with a communicating portion 8 such that a toner refilling portion 10 may be accessed from the outside of the main body 1 in a state in which the development cartridge 2 is mounted on the main body 1. The main body 1 may be equipped with the development cartridge 2 to supply a toner contained in a toner container 230 to an electrostatic latent image formed on a photoconductor to form a toner image. The communicating portion 8 may be connected to the toner refilling portion 10 of the development cartridge 2 and formed in an outer surface of the main body 1 to accept a toner reload kit 9 for refilling the toner in the toner container 230. The communicating portion 8 may be provided at a position close to a front portion 1-2 of the main body 1. Because the front portion 1-2 is exposed to the user, the user may easily access the communication portion 8. Therefore, a toner refilling operation using the toner reload kit 9 may be easily performed through the communicating portion 8. The communicating portion 8 may be provided on an upper surface 1-1 of the main body 1. The toner refilling portion 10 may be located at a lower portion of the communicating portion 8. The communicating portion 8 and the toner refilling portion 10 may be aligned in a vertical direction. The toner reloading kit 9 may access the toner refilling portion 10 from above the main body 1 through the communicating portion 8.

Referring to the internal structure diagram 120 of FIG. 1 and FIG. 2, a photoconductive drum 21 may be an example of a photoconductor on which an electrostatic latent image is formed may include a cylindrical metal pipe and a photoconductive layer formed on an outer periphery of the cylindrical metal pipe. A charging roller 23 is an example of a charger that charges a surface of the photoconductive drum 21 to a uniform potential. A charging bias voltage may be applied to the charging roller 23. A corona charger (not shown) may be used instead of the charging roller 23. A developing roller 22 may supply the toner to the electrostatic latent image formed on the surface of the photoconductive drum 21 to develop the electrostatic latent image.

A supply roller 24 may allow the toner to be adhered to the developing roller 22. A supply bias voltage may be applied to the supply roller 24 to adhere the toner using the developing roller 22. A regulating member 25 may regulate an amount of toner adhering to the surface of the developing roller 22. The regulating member 25 may be, for example, a regulating blade having a tip in contact with the developing roller 22 at a predetermined pressure. A cleaning member 26 may remove a residual toner and a foreign substance from the surface of the photoconductive drum 21 before charging. The cleaning member 26 may be, for example, a cleaning blade having a tip in contact with the surface of the photoconductive drum 21. Hereinbelow, the foreign substance removed from the surface of the photoconductive drum 21 is referred to as a waste toner.

An optical scanner 4 may scan the surface of the photoconductive drum 21, charged with a uniform potential, with a light modulated in accordance with image information. As the optical scanner 4, for example, a laser scanning unit (LSU) may be employed in which a light irradiated from a laser diode is deflected in a main scanning direction by using a polygon mirror to scan the photoconductive drum 21.

A transfer roller 5 is an example of a transfer unit which is located opposite to the photoconductive drum 21 to form a transfer nip. A transfer bias voltage for transferring the developed toner image onto the surface of the photoconductive drum 21 to a print medium P may be applied to the transfer roller 5. Instead of the transfer roller 5, a corona transfer unit may be used.

The toner image transferred to a surface of the printing medium P by the transfer roller 5 may be maintained on the surface of the printing medium P by the electrostatic attraction. A fixing unit 6 may form a permanent print image on the print medium P by applying heat and pressure and fixing the toner image on the print medium P.

The development cartridge 2 may include a developing portion 210 in which the photoconductive drum 21 and the developing roller 22 are provided, a waste toner container 220 in which the waste toner removed from the photoconductive drum 21 is contained, and the toner container 230 combined with the developing portion 210 and containing the toner. In order to refill the toner in the toner container 230, the development cartridge 2 may include the toner refilling portion 10 combined with the toner container 230. The toner refilling portion 10 provides an interface between the toner reload kit 9 and the development cartridge 2. The development cartridge 2 may be an integral type development cartridge that includes the developing portion 210, the waste toner container 220, the toner container 230, and the toner refilling portion 10. The developing portion 210 may include a sensor 260 to sense an amount of toner remaining in the developing portion 210. When the amount of toner sensed by the sensor 260 is less than a predetermined target toner amount, the developing portion 210 may receive toner from the toner container 230.

A part of the outer periphery of the photoconductive drum 21 may be exposed to the outside of the development cartridge 2. The transfer roller 5 may be in contact with the exposed part of the photoconductive drum 21 to form a transfer nip. The developing portion 210 may be provided with one or more conveying members to convey the toner toward the developing roller 22. The one or more conveying members may also serve to stir the toner and charge the toner to a predetermined potential.

The waste toner container 220 may be located on an upper side of the developing portion 210. The waste toner container 220 may be spaced upward from the developing portion 210 to form a light path 250 therebetween. The waste toner removed from the photoconductive drum 21 by the cleaning member 26 may be contained in the waste toner container 220. The waste toner removed from the surface of the photoconductive drum 21 may be transported to the inside of the waste toner container 220 by one or more waste toner transporting members 221, 222, and 223. A shape and a number of waste toner transporting members are not particularly limited. An appropriate number of waste toner transporting members may be provided at appropriate positions to effectively disperse the waste toner in the waste toner container 220 in consideration of a volume and a shape of the waste toner container 220.

The toner container 230 may be combined with the toner refilling portion 10 to contain the toner. The toner container 230 may be combined with the developing portion 210 by a toner supplying portion 234 as shown by a dotted line in the internal structure diagram 120 of FIG. 1. The toner supplying portion 234 may be combined with the developing portion 210 by passing through the waste toner container 220 in a vertical direction as shown in the internal structure diagram 120 of FIG. 1. The toner supplying portion 234 may be located outside an effective width of an exposure light L so as not to interfere with the exposure light L scanned in the main scanning direction by the optical scanner 4.

One or more toner supplying members 231, 232, and 233 for supplying a toner to the developing portion 210 through the toner supplying portion 234 may be installed in the toner container 230. A shape and a number of toner supplying members are not particularly limited. An appropriate number of toner supplying members may be provided at appropriate positions in the toner container 230 in order to efficiently supply the toner to the developing portion 210 in consideration of a volume and a shape of the toner container 230. The toner supplying member 233 may transfer the toner to the toner supplying portion 234.

An example image forming process according to the above-described structure will be briefly described. A charging bias may be applied to the charging roller 23. The photoconductive drum 21 may be charged to a uniform potential. The optical scanner 4 may scan the photoconductive drum 21 with the modulated light corresponding to the image information to form an electrostatic latent image on the surface of the photoconductive drum 21. The supply roller 24 may allow the toner to be adhered to the surface of the developing roller 22. The regulating member 25 may form a uniform toner layer on the surface of the developing roller 22. A developing bias voltage may be applied to the developing roller 22. The toner conveyed to the developing nip as the developing roller 22 is rotated may be moved to and adhered to the electrostatic latent image formed on the surface of the photoconductive drum 21 by the developing bias voltage such that a visible toner image may be formed on the surface of the photoconductive drum 21. The print medium P, pulled from a loading tray 7 by a pickup roller 71, may be transported to the transfer nip, where the transfer roller 5 and the photoconductive drum 21 face each other, by a transporting roller 72. When a transfer bias voltage is applied to the transfer roller 5, the toner image may be transferred to the print medium P by electrostatic attraction. The toner image transferred to the print medium P may be subjected to heat and pressure from the fixing unit 6 and fixed on the print medium P, whereby printing may be completed. The print medium P may be discharged by a discharge roller 73. The toner remaining on the surface of the photoconductive drum 21 without being transferred to the print medium P may be removed by the cleaning member 26.

According to an example, the development cartridge 2 may be provided with the toner refilling portion 10 such that the toner may be refilled in the development cartridge 2 in a state in which the development cartridge 2 is mounted on the main body 1 without removing the development cartridge 2 from the main body 1. The toner refilling portion 10 may be integrally formed with the development cartridge 2 and may be attached to or detached from the main body 1 together with the development cartridge 2.

The example image forming apparatus 100 described with reference to FIGS. 1 and 2 may correspond to the example image forming apparatus 100 that will be described with reference to FIGS. 3 to 10. Further, an example developing apparatus 1010 that will be described with reference to FIGS. 3 to 10 may correspond to an apparatus including the example developing portion 210 in the development cartridge 2 described in FIGS. 1 and 2. For example, the developing apparatus 1010 that will be described with reference to FIGS. 3 to 10 may include the photoconductive drum 21, the developing roller 22, the charging roller 23, the supply roller 24, the regulating roller 22, the cleaning member 26, the transfer roller 5, the developing portion 210, and the sensor 260 described with reference to FIGS. 1 and 2. The example toner container 230 described with reference to FIGS. 1 and 2 may correspond to an example toner cartridge 1020 described with reference to FIGS. 3 to 10.

Figure 3:
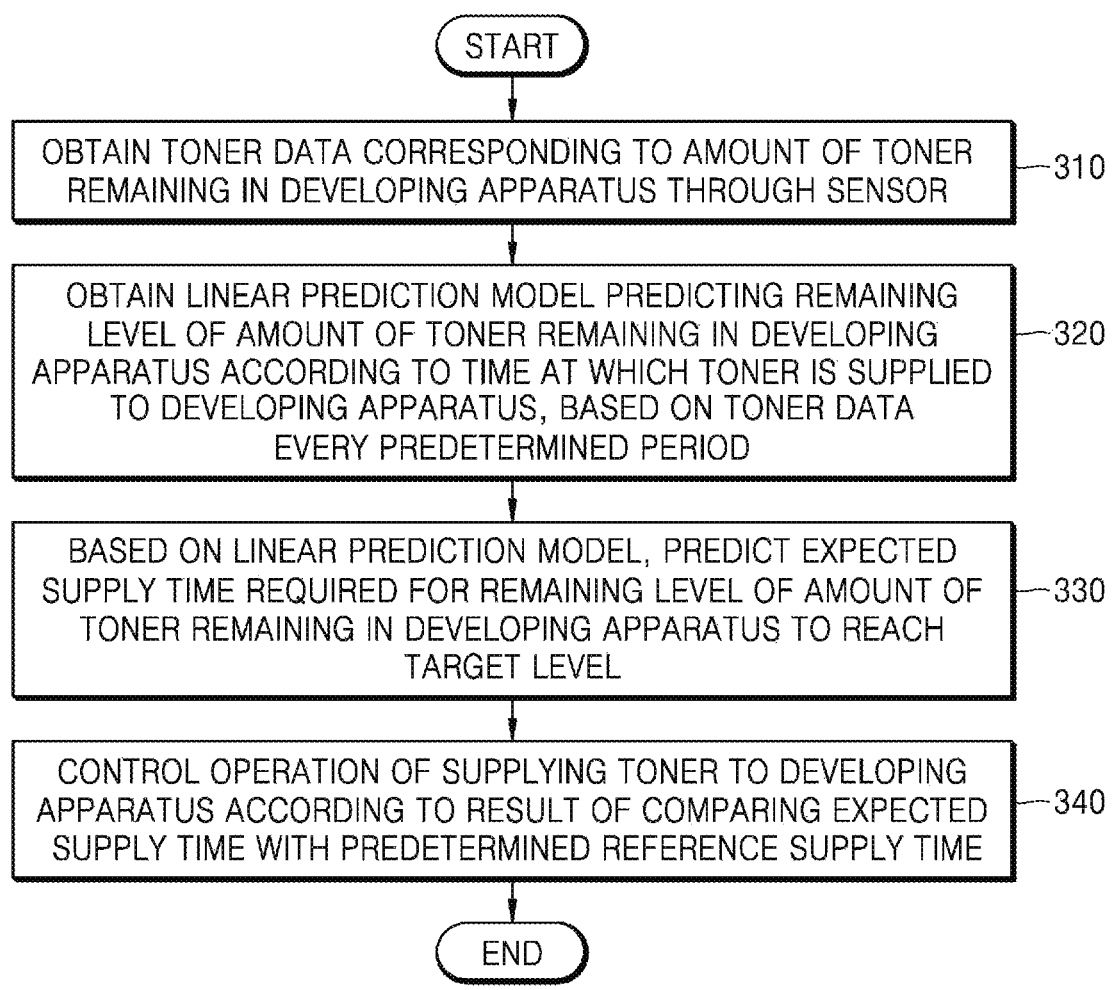
FIG. 3 is a flowchart for explaining an operation of controlling supply of a toner using a linear prediction model, according to an example.

FIG. 3 is a flowchart for explaining an operation of controlling supply of a toner using a linear prediction model, according to an example.

Referring to FIG. 3, the image forming apparatus 100 may obtain toner data corresponding to an amount of toner remaining in the developing apparatus 1010 through a sensor in the image forming apparatus 100, in operation 310.

In operation 320, the image forming apparatus 100 may obtain a linear prediction model based on the toner data every predetermined period. Here, the linear prediction model is a model to predict an amount of toner remaining in the developing apparatus 1010 according to a time at which the toner is supplied to the developing apparatus 1010.

The image forming apparatus 100 may analyze a trend of the toner supply from the toner data accumulated from a toner supply start point to an end point of a predetermined period. The image forming apparatus 100 may obtain the linear prediction model that predicts the amount of toner remaining in the developing apparatus 1010 according to the supply time of the toner based on a result of analyzing the trend of toner supply.

For example, the linear prediction model may be a first order linear function that calculates the amount of toner remaining in the developing apparatus 1010 over time.

On the other hand, the image forming apparatus 100 may determine a predetermined period and a maximum period of supplying the toner according to the predetermined period.

In operation 330, the image forming apparatus 100 may predict, based on the linear prediction model, an expected supply time required for the amount of toner remaining in the developing apparatus 1010 to reach a target level.

In operation 340, the image forming apparatus 100 may control an operation of supplying the toner to the developing apparatus 1010 according to a result of comparing the expected supply time with a predetermined reference supply time.

For example, when the expected supply time is shorter than the reference supply time, the image forming apparatus 100 may continue to perform the operation of supplying the toner to the developing apparatus 1010. For example, when an n-th expected supply time predicted from an n-th linear prediction model with respect to an n-th period is shorter than a reference supply time corresponding to the n-th period, the image forming apparatus 100 may continue to perform the operation of supplying the toner to the developing apparatus 1010 to a start point of an n+1th period. The image forming apparatus 100 may obtain an n+1th linear prediction model with respect to the n+1th period. The image forming apparatus 100 may predict an n+1th expected supply time required for the amount of toner remaining in the developing apparatus 1010 to reach the target level from an n+1th linear prediction model. The image forming apparatus 100 may control the operation of supplying the toner to the developing apparatus 1010 according to a result of comparing the n+1th expected supply time with a reference supply time corresponding to the n+1th period.

On the other hand, when the amount of toner remaining in the developing apparatus 1010 reaches the target level as the toner is supplied to the developing apparatus 1010, the image forming apparatus 100 may stop the operation of supplying the toner to the developing apparatus 1010.

For example, when the expected supply time is longer than the reference supply time, the image forming apparatus 100 may stop the operation of supplying the toner to the developing apparatus 1010. Also, the image forming apparatus 100 may stop an operation of an organic photoconductor (OPC) in the image forming apparatus 100. Further, the image forming apparatus 100 may determine that an amount of toner in a toner cartridge 1020 mounted in the image forming apparatus 100 is in a low state. The image forming apparatus 100 may output a replacement notification of the toner cartridge 1020. The toner cartridge 1020 of the image forming apparatus 100 may be supplied with toner from a toner refill kit.

For example, the linear prediction model may be a first order linear function that calculates the amount of toner remaining in the developing apparatus 1010 over time. When a slope (i.e., an inclination value) of the first order linear function is negative or when an expected supply time calculated from the first order linear function does not satisfy a range of the reference supply time, the image forming apparatus 100 may stop the operation of supplying the toner to the developing apparatus 1010.

For example, in a case in which there is a sufficient amount of toner to perform a predetermined image forming operation in the toner cartridge 1020 mounted in the image forming apparatus 100, when the expected supply time predicted from the linear prediction model is longer than the reference supply time, the image forming apparatus 100 may determine a state of the image forming apparatus 100 as a state in which a predetermined defect exists in the image forming apparatus 100. The image forming apparatus 100 may output defect information of a position where the predetermined defect exists or a predetermined component in which the predetermined defect exists.

Also, the image forming apparatus 100 may set the reference supply time corresponding to each period such that the reference supply time corresponding to each period decreases from a first period for firstly predicting the expected supply time to the maximum period according to the maximum supply time.

On the other hand, the image forming apparatus 100 may receive a request for performing a predetermined image forming operation from the image forming apparatus 100 or an external apparatus. The predetermined image forming operation may not be performed because the amount of toner remaining in the developing apparatus 1010 is lower than the target level. The image forming apparatus 100 may display state information of the image forming apparatus 100 with respect to at least one of a state in which the amount of toner in the toner cartridge 1020 mounted on the image forming apparatus 100 is low and a state in which the toner is supplied to the developing apparatus 1010.

Figure 4:
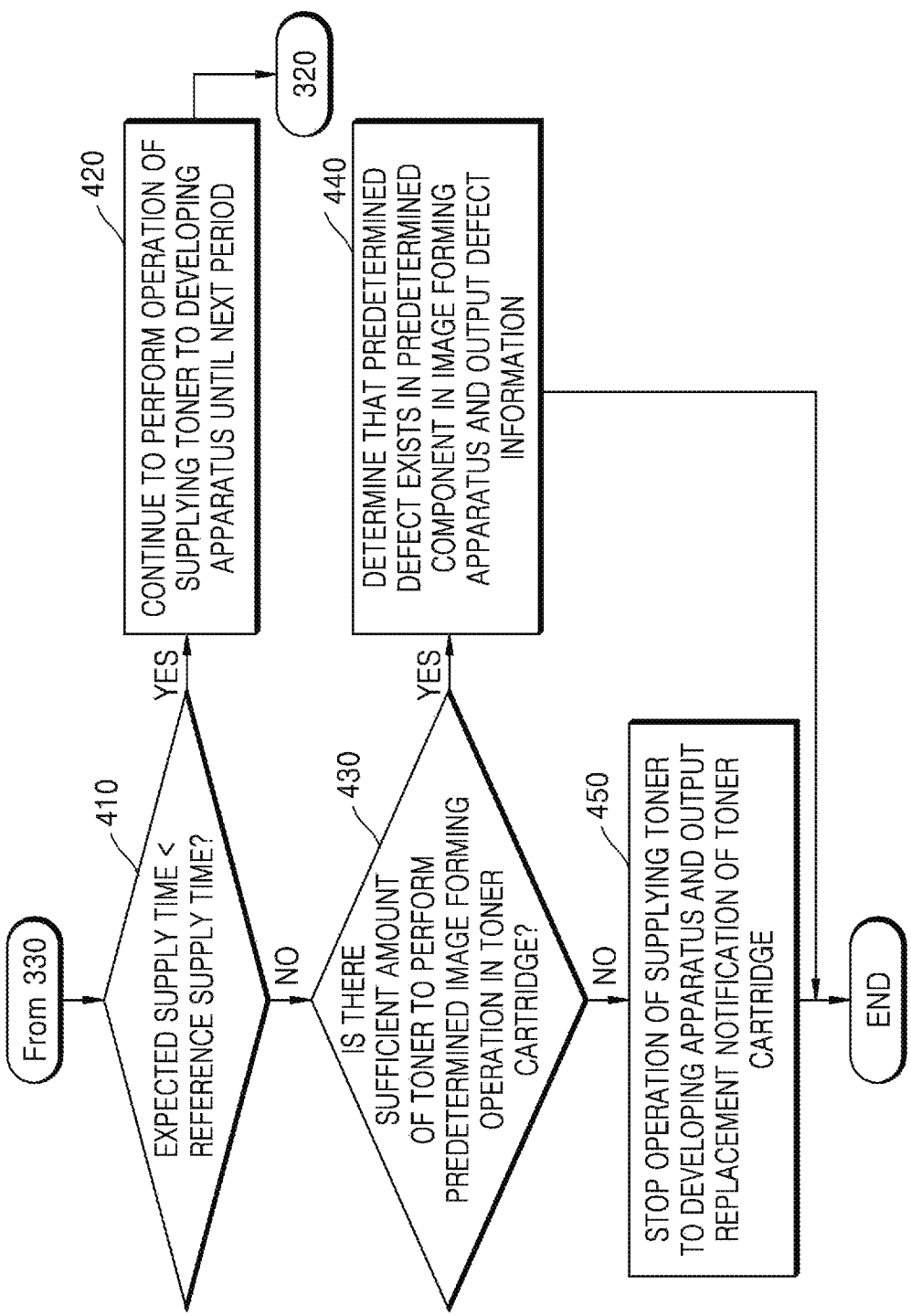
FIG. 4 is a flowchart for explaining an operation of controlling supply of a toner based on a comparison of an expected supply time and a reference supply time, according to an example.

FIG. 4 is a flowchart for explaining an operation of controlling supply of a toner based on a comparison of an expected supply time and a reference supply time, according to an example.

A method of operating the image forming apparatus 100 shown in FIG. 4 is an example of operation 340 of the image forming apparatus 100. In other examples, the supply of the toner may be controlled using another method.

Referring to FIG. 4, the image forming apparatus 100 may determine whether the expected supply time required for reaching an amount of toner remaining in the developing apparatus 1010 is shorter than the predetermined reference supply time in operation 410.

When the expected supply time is shorter than the reference supply time, the image forming apparatus 100 may continue to perform an operation of supplying the toner to the developing apparatus 1010 until a next period according to operation 420. For example, when a period is 30 seconds, the expected supply time estimated from toner data accumulated from a toner supply start time to 30 seconds may be 37 seconds. Also, for example, the reference supply time at a time of 30 seconds may be 720 seconds. In this case, because the expected supply time is shorter than the reference supply time, the image forming apparatus 100 may determine that the toner may be supplied from the toner cartridge 1020 to the developing apparatus 1010. The image forming apparatus 100 may continue to perform the operation of supplying the toner to the developing apparatus 1010 from a second period of 30 seconds to 60 seconds. At a time of 60 seconds, the image forming apparatus 100 may obtain a linear prediction model corresponding to a section from 0 second to 60 seconds according to operation 320.

When the expected supply time is longer than the reference supply time, the image forming apparatus 100 may determine whether there is a sufficient amount of toner to perform a predetermined image forming operation in the toner cartridge 1020 according to operation 430. For example, when the amount of toner in the toner cartridge 1020 is sufficient but there is a foreign substance in a supply pipe line to which the toner in the toner cartridge 1020 is supplied, because the supply of the toner to the developing apparatus 1010 is not smooth, the expected supply time may be predicted to be longer than the reference supply time. The image forming apparatus 100 may determine an amount of toner supplied to the developing apparatus 1010 and an amount of toner remaining in the toner cartridge 1020 based on at least one of a number of image forming operations performed after the toner cartridge 1020 is mounted on the image forming apparatus 100 or a number of rotations of a component in the image forming apparatus 100 due to an image forming operation. When the amount of toner remaining in the toner cartridge 1020 exceeds a predetermined amount of toner, the image forming apparatus 100 may determine that there is the sufficient amount of toner in the toner cartridge 1020 to perform the predetermined image forming operation. Conversely, when the amount of toner remaining in the toner cartridge 1020 is less than a predetermined amount of toner, the image forming apparatus 100 may determine that the amount of toner in the toner cartridge 1020 is in a low state.

When it is determined that there is the sufficient amount of toner in the toner cartridge 1020 to perform the predetermined image forming operation, the image forming apparatus 100 may determine, according to operation 440, that a predetermined defect exists in the image forming apparatus 100. The image forming apparatus 100 may detect a state of a predetermined component used for supplying the toner to the developing apparatus 1010 or a state of a toner supply path to detect a cause of inhibiting the supply of toner. The image forming apparatus 100 may obtain defect information of at least one of a position where the predetermined defect exists and a predetermined component in which the predetermined defect exists, based on the cause of inhibiting the supply of toner. The image forming apparatus 100 may output the defect information.

The image forming apparatus 100 may stop the operation of supplying the toner to the developing apparatus 1010 according to operation 450 when the image forming apparatus 100 determines that there is an insufficient amount of toner in the toner cartridge 1020 to perform the predetermined image forming operation. In an example, the image forming apparatus 100 may stop an operation of an OPC in the image forming apparatus 100. Further, the image forming apparatus 100 may determine that the amount of toner in the toner cartridge 1020 is in the low state and may output a replacement notification of the toner cartridge 1020. Also, the toner cartridge 1020 in the image forming apparatus 100 may perform the operation of supplying the toner to the developing apparatus 1010 after the toner is supplied through a toner reload kit.

Figure 5:
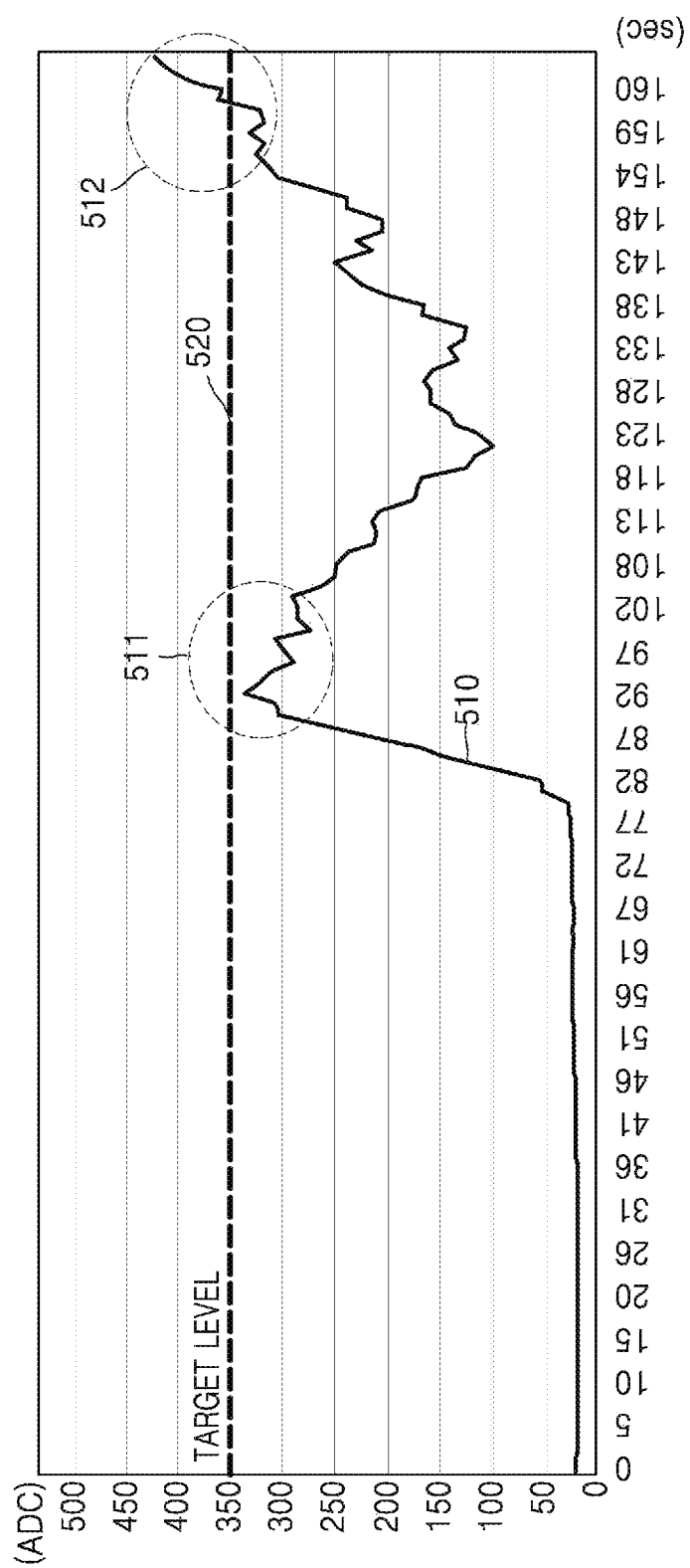
FIG. 5 is a diagram for explaining a process in which an amount of toner remaining in a developing apparatus reaches a target level based on supply of the toner, according to an example.

FIG. 5 is a diagram for explaining a process in which an amount of toner remaining in a developing apparatus reaches a target level based on supply of the toner, according to an example.

Referring to FIG. 5, the developing apparatus 1010 in the image forming apparatus 100 may be designed such that a target amount of toner is filled in the developing apparatus 1010. The image forming apparatus 100 may maintain density and quality of an image output due to a predetermined image forming operation at an appropriate level when a target amount of toner is maintained in the developing apparatus 1010. Therefore, when the amount of toner remaining in the developing apparatus 1010 is less than the target amount of toner, the image forming apparatus 100 may perform an operation of supplying the toner to the developing apparatus 1010 such that the level 510 of the amount of toner remaining in the developing apparatus 1010 reaches a target level 520 corresponding to the target amount of toner. The image forming apparatus 100 may control operations of the toner cartridge 1020 and the developing apparatus 1010 such that the toner in the toner cartridge 1020 may be supplied to the developing apparatus 1010.

A sensor to detect the amount of toner in the developing apparatus 1010 may be provided in the developing apparatus 1010. The sensor may obtain toner data corresponding to the amount of toner remaining in the developing apparatus 1010. As an example, FIG. 5 is a graph showing the level 510 of the amount of toner remaining in the developing apparatus 1010 over time, based on the toner data obtained from the sensor. For example, the level 510 of the amount of toner remaining in the developing apparatus 1010 may be represented as an ADC value converted into 10 bits of a voltage output from the sensor.

As shown in FIG. 5, when the level 510 of the amount of toner remaining in the developing apparatus 1010 is lower than the target level 520, the image forming apparatus 100 may supply the toner to the developing apparatus 1010 such that the level 510 of the amount of toner remaining in the developing apparatus 1010 reaches the target level 520. For example, referring to a region 511, the level 510 of the amount of remaining toner may approach the target level 520 after 90 seconds have elapsed from a supply start time of toner. Because the level 510 has not reached the target level 520, the image forming apparatus 100 may continue to perform an operation of supplying the toner to the developing apparatus 1010. Referring to a region 512, the level 510 of the amount of remaining toner may reach the target level 520 after 160 seconds have elapsed from the supply start time of toner. The image forming apparatus 100 may temporarily suspend the operation of supplying the toner until the level 510 is lower than the target level 520.

Figure 6:
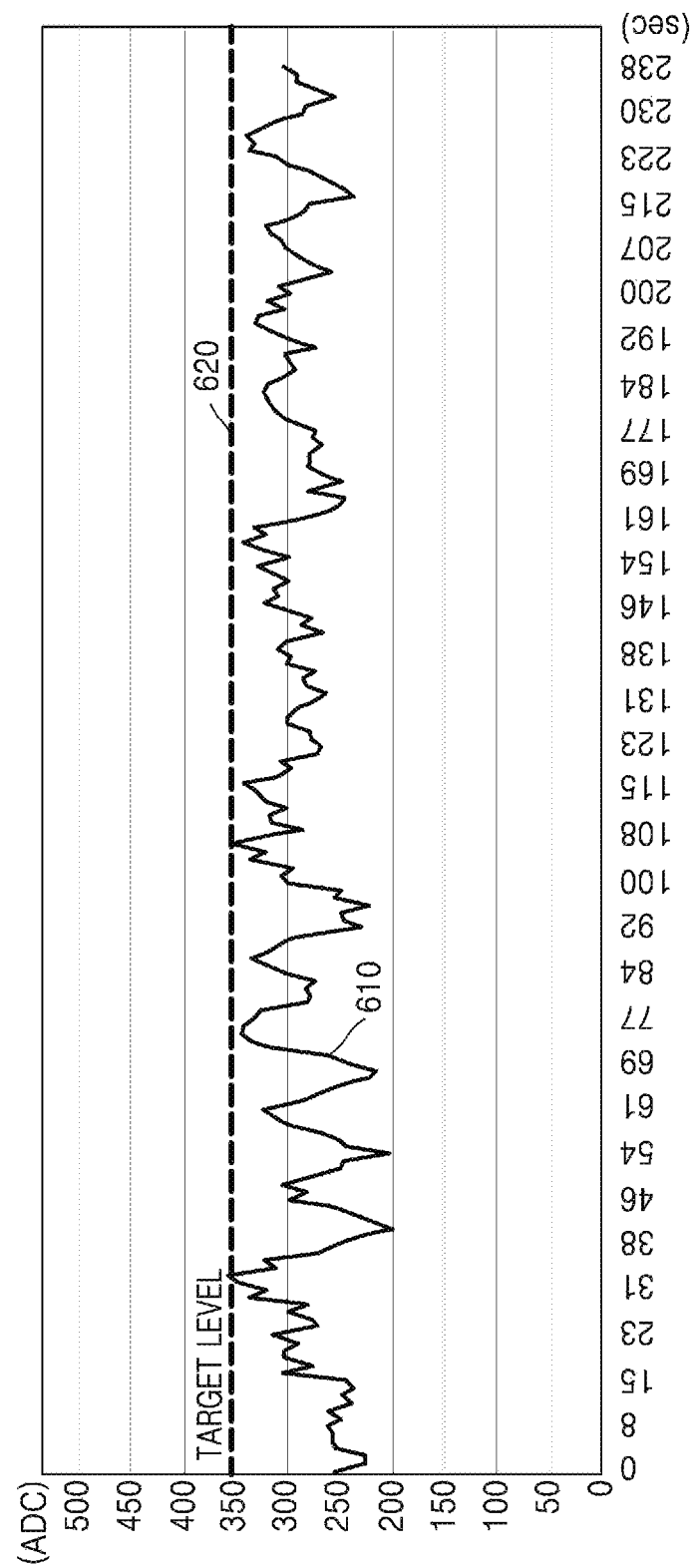
FIG. 6 is a diagram for explaining a result that an amount of toner remaining in a developing apparatus does not reach a target level even though an operation of supplying toner is performed when the amount of toner is in a low state, according to an example.

FIG. 6 is a diagram for explaining a result that an amount of toner remaining in a developing apparatus does not reach a target level even though an operation of supplying toner is performed when the amount of toner is in a low state, according to an example.

Referring to FIG. 6, when the amount of toner remaining in the developing apparatus 1010 is less than a target amount of toner, the image forming apparatus 100 may perform an operation of supplying the toner to the developing apparatus 1010 such that a level 610 of the amount of toner remaining in the developing apparatus 1010 reaches a target level 620 corresponding to the target amount of toner. In this case, when the amount of toner in the toner cartridge 1020 is almost exhausted, even though the operation of supplying toner is performed as in a graph shown in FIG. 6, the level 610 of the amount of toner remaining in the developing apparatus 1010 may not reach the target level 620.

As the image forming apparatus 100 performs the operation of supplying the toner to the developing apparatus 1010, the OPC also performs a rotating operation. Because the OPC is also a consumable product, the greater the number of rotations of the OPC in the image forming apparatus 100, the shorter the lifespan of the OPC. Further, when it takes a long time for the image forming apparatus 100 to perform the operation of supplying the toner to the developing apparatus 1010, it takes a user a long waiting time until a predetermined image forming operation is completed. Referring to the graph of FIG. 6, the user may wait for 240 seconds, which results in an inconvenience.

On the other hand, the operation of supplying the toner to the developing apparatus 1010 may be set within the maximum supply time such that the level 610 of the amount of remaining toner reaches the target level 620. When the level 610 of the amount of remaining toner does not reach the target level 620, the image forming apparatus 100 may continue to perform the operation of supplying the toner to the developing apparatus 1010, and may also continue to perform an operation of the consumable product used in the operation of supplying the toner.

When the level 610 of the amount of remaining toner in the developing apparatus 1010 may not reach the target level 620, the image forming apparatus 100 may determine a state in which the level 610 of the amount of remaining toner reaches the target level 620 at a time earlier than the maximum supply time and stop the operation of supplying the toner to the developing apparatus 1010, thereby reducing an unnecessary operation in the image forming apparatus 100. That is, by reducing the unnecessary operation in the image forming apparatus 100, the lifespan of the consumable product used may be extended as the operation of supplying the toner to the developing apparatus 1010 is performed by the image forming apparatus 100. Also, the time that the user waits may also be reduced due to the operation of supplying the toner performed by the image forming apparatus 100.

As shown in FIG. 6, the maximum supply time of the toner in the image forming apparatus 100 may be set to 240 seconds. The level 610 of the amount of toner remaining in the developing apparatus 1010 may not reach the target level 620 even through the operation of supplying the toner is continuously performed when the toner is almost exhausted in the toner cartridge 1020 and the amount of toner is in a low state. The image forming apparatus 100 may predict an expected supply time required for the level 610 of the amount of remaining toner to reach the target level 620 every predetermined period, and when the expected supply time exceeds a range of a reference supply time, may stop the operation of supplying the toner, thereby reducing the unnecessary operation in the image forming apparatus 100 at a time earlier than the maximum supply time of the toner. An example operation of predicting an expected supply time and controlling the supply of toner will be described in FIGS. 7 to 9.

Figure 7:
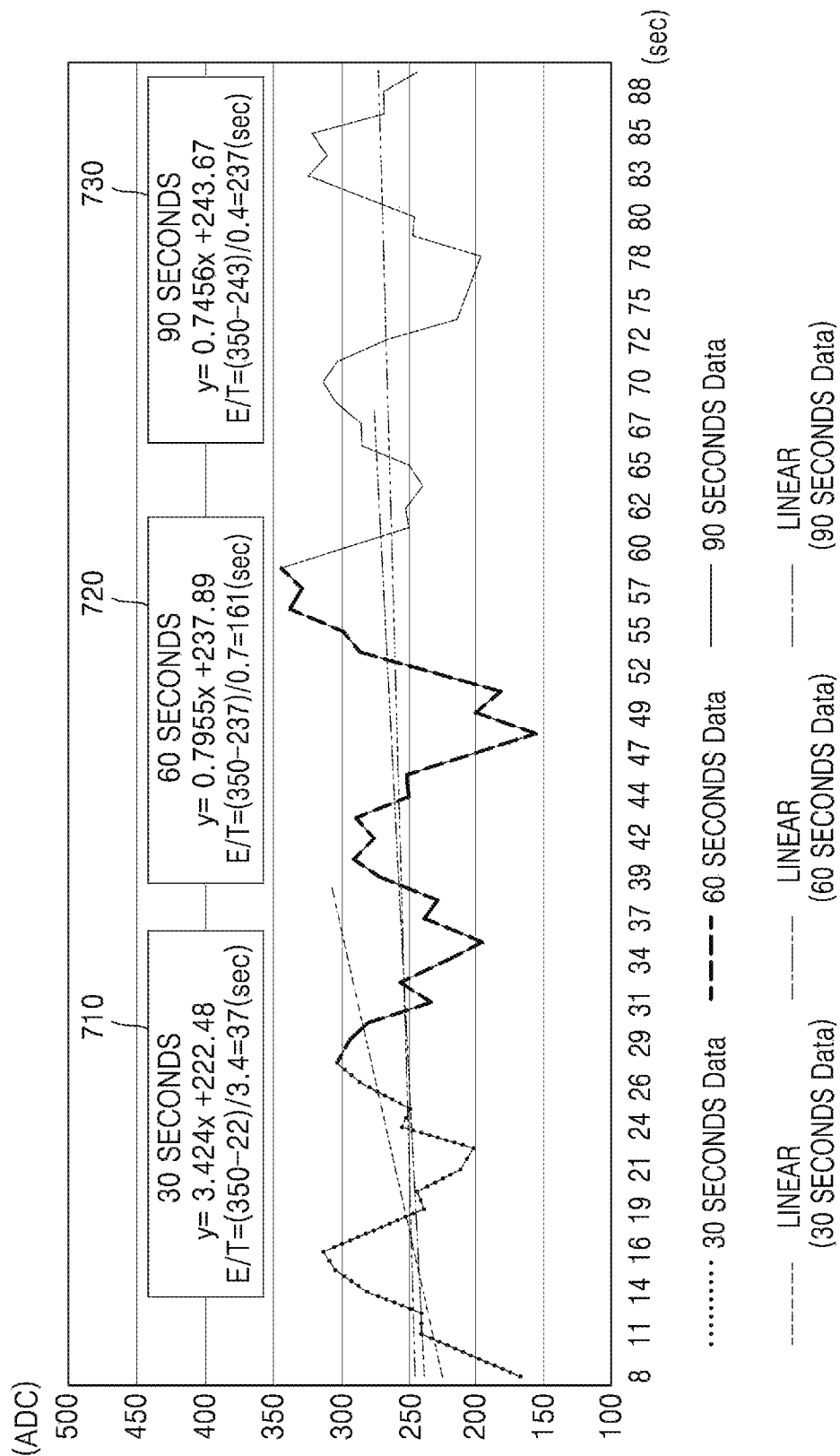
FIG. 7 is a diagram for explaining a process of predicting an expected supply time required for an amount of remaining toner to reach a target level using a linear prediction model every predetermined period, and controlling an operation of supplying the toner based on a result of comparing the expected supply time with a reference supply time, according to an example.

FIG. 7 is a diagram for explaining a process of predicting an expected supply time required for an amount of toner to reach a target level using a linear prediction model every predetermined period, and controlling an operation of supplying the toner based on a result of comparing the expected supply time with a reference supply time, according to an example.

Referring to FIG. 7, the image forming apparatus 100 may analyze a trend of toner supply based on toner data accumulated from a sensor every 30 seconds, and based on an analysis result, may obtain the linear prediction model that predicts the amount of toner remaining in the developing apparatus 1010. For example, the image forming apparatus 100 may obtain a first order linear function that predicts the amount of remaining toner based on a linear regression analysis. The image forming apparatus 100 may calculate the expected supply time required for the amount of toner remaining in the developing apparatus 1010 to reach the target level from the linear prediction model. The image forming apparatus 100 may compare the expected supply time with a predetermined reference supply time. As a result of the comparison, when the expected supply time is shorter than the reference supply time, the image forming apparatus 100 may continue to perform the operation of supplying the toner to the developing apparatus 1010. On the other hand, when the expected supply time is longer than the reference supply time, the image forming apparatus 100 may stop the operation of supplying the toner to the developing apparatus 1010.

FIG. 7 is a graph showing the amount of toner remaining in the developing apparatus 1010 over time and the linear prediction model based on toner data obtained from a sensor. In FIG. 7, graphs showing the amount of remaining toner at intervals of 30 seconds are distinctively displayed, and graphs of the first order linear function which is the linear prediction model obtained at intervals of 30 seconds are distinctively displayed.

Referring to a block 710 of FIG. 7, the image forming apparatus 100 may obtain y=3.424x+222.48 as a first linear prediction model, based on toner data accumulated from 0 second, which is a supply start time of toner, to 30 seconds at a time of 30 seconds. The image forming apparatus 100 may calculate a first expected supply time required for the level of remaining toner to reach the target level of 350 ADC from the first linear prediction model. The first expected supply time may be approximately 37 seconds. A first reference supply time corresponding to the time of 30 seconds may be set to be within 720 seconds. Because the first expected supply time is shorter than the first reference supply time, the image forming apparatus 100 may continue to perform the operation of supplying the toner to the developing apparatus 1010 until the time reaches 60 seconds.

Referring to a block 720 of FIG. 7, the image forming apparatus 100 may obtain y=0.7955x+237.89 as a second linear prediction model, based on toner data accumulated from 0 second to 60 seconds at a time of 60 seconds. The image forming apparatus 100 may calculate a second expected supply time required for the level of remaining toner to reach the target level of 350 ADC from the second linear prediction model. The second expected supply time may be approximately 161 seconds. A second reference supply time corresponding to the time of 60 seconds may be set to be within 480 seconds. Because the second expected supply time is shorter than the second reference supply time, the image forming apparatus 100 may continue to perform the operation of supplying the toner to the developing apparatus 1010 until the time reaches 90 seconds.

Referring to a block 730 of FIG. 7, the image forming apparatus 100 may obtain y=0.7456x+243.67 as a third linear prediction model, based on toner data accumulated from 0 second to 90 seconds at a time of 90 seconds. The image forming apparatus 100 may calculate a third expected supply time required for the level of remaining toner to reach the target level of 350 ADC from the second linear prediction model. The third expected supply time may be approximately 237 seconds. A third reference supply time corresponding to the time of 90 seconds may be set to be within 300 seconds. Because the third expected supply time is shorter than the third reference supply time, the image forming apparatus 100 may continue to perform the operation of supplying the toner to the developing apparatus 1010 until the time reaches 120 seconds.

The image forming apparatus 100 may confirm whether the level of remaining toner reaches the target level or the expected supply time required for the level of remaining toner to reach the target level, according to a period of 30 seconds. When the level of remaining toner reaches the target level, the image forming apparatus 100 may temporarily suspend the operation of supplying the toner to a time at which the level of remaining toner is lower than the target level. Further, the image forming apparatus 100 may control the operation of supplying the toner to the developing apparatus 1010 within the maximum supply time of the toner.

FIG. 8 is a diagram for explaining a reference time corresponding to a predetermined period, according to an example.

Referring to FIG. 8, the maximum supply time at which toner may be supplied to the developing apparatus 1010 may be set in the image forming apparatus 100. The image forming apparatus 100 may control operation of the toner cartridge 1020 used to supply the toner and the developing apparatus 1010 such that an amount of remaining toner in the developing apparatus 1010 reaches a target level corresponding to a target amount of toner within the maximum supply time.

The image forming apparatus 100 may determine a period that predicts an expected supply time required for the amount of remaining toner to reach the target level within the maximum supply time. For example, the image forming apparatus 100 may determine the period that predicts the expected supply time to be 30 seconds.

The image forming apparatus 100 may set a reference supply time at which the toner may be supplied to the developing apparatus 1010. For example, the image forming apparatus 100 may set the reference supply time corresponding to each period such that the reference supply time corresponding to each period decreases from a first period to the maximum period. For example, referring to a table 810 shown in FIG. 8, the image forming apparatus 100 may set the reference supply time corresponding to each of 30 seconds, 60 seconds, 90 seconds, 120 seconds, and 150 seconds.

Figure 9:
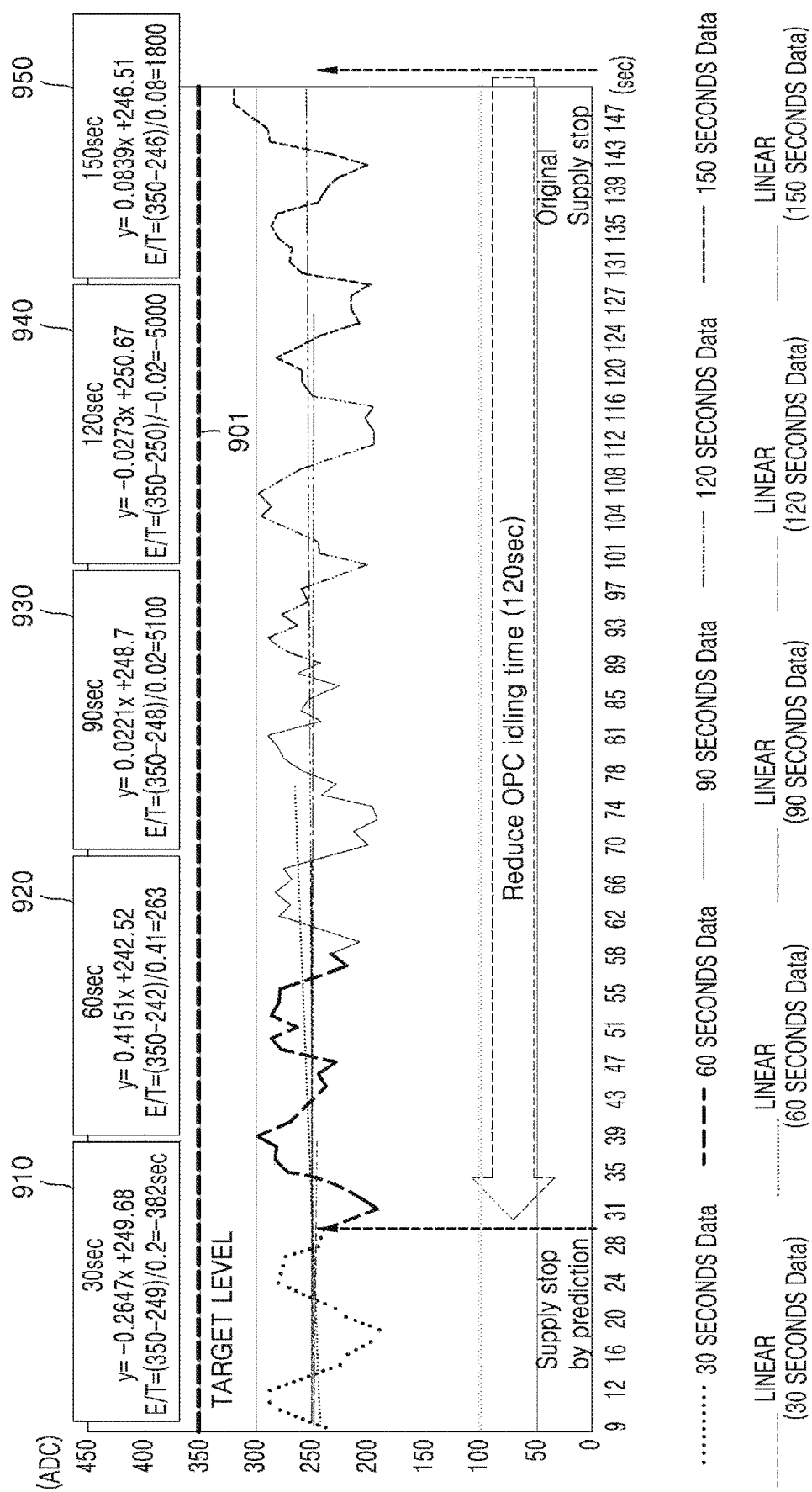
FIG. 9 is a diagram for explaining a process of predicting an expected supply time required for an amount of remaining toner to reach a target level using a linear prediction model every predetermined period, and stopping an operation of supplying the toner based on a result of comparing the expected supply time with a reference supply time according to the result, according to an example.

FIG. 9 is a diagram for explaining a process of predicting an expected supply time required for an amount of remaining toner to reach a target level using a linear prediction model every predetermined period, and stopping an operation of supplying the toner based on a result of comparing the expected supply time with a reference supply time, according to the result.

Referring to FIG. 9, a graph is illustrated showing the amount of toner remaining in the developing apparatus 1010 over time and the linear prediction model, based on toner data obtained from a sensor. In FIG. 9, graphs showing the amount of remaining toner at intervals of 30 seconds (30 seconds, 60 seconds, 90 seconds, 120 seconds, and 150 seconds) are distinctively displayed, and graphs of a first order linear function which is the linear prediction model obtained at intervals of 30 seconds (30 seconds, 60 seconds, 90 seconds, 120 seconds, and 150 seconds) are distinctively displayed.

For example, when a slope of the first order linear function is a negative number, or when the expected supply time calculated from the first order linear function does not satisfy a range of the reference supply time, the image forming apparatus 100 may stop the operation of supplying the toner to the developing apparatus 1010. The reference supply time may be referenced to the table 810 shown in FIG. 8.

For example, referring to a block 910 of FIG. 9, the image forming apparatus 100 may obtain y=−0.2647x+249.68 as a first linear prediction model, based on toner data accumulated from 0 second which is a supply start time of toner to 30 seconds at a time of 30 seconds. The image forming apparatus 100 may calculate a first expected supply time required for the level of remaining toner to reach the target level of 350 ADC from the first linear prediction model. The first expected supply time may be approximately −382 seconds.

Referring to a block 920 of FIG. 9, the image forming apparatus 100 may obtain y=0.4151x+242.52 as a second linear prediction model, based on toner data accumulated from 0 second to 60 seconds at a time of 60 seconds. The image forming apparatus 100 may calculate a second expected supply time required for the level of remaining toner to reach the target level of 350 ADC from the second linear prediction model. The second expected supply time may be approximately 263 seconds.

Referring to a block 930 of FIG. 9, the image forming apparatus 100 may obtain y=0.0221x+248.7 as a third linear prediction model, based on toner data accumulated from 0 second to 90 seconds at a time of 90 seconds. The image forming apparatus 100 may calculate a third expected supply time required for the level of remaining toner to reach the target level of 350 ADC from the second linear prediction model. The third expected supply time may be approximately 5100 seconds.

Referring to a block 940 of FIG. 9, the image forming apparatus 100 may obtain y=−0.0273x+250.67 as a fourth linear prediction model, based on toner data accumulated from 0 second to 120 seconds at a time of 120 seconds. The image forming apparatus 100 may calculate a fourth expected supply time required for the level of remaining toner to reach the target level of 350 ADC from the fourth linear prediction model. The fourth expected supply time may be approximately −5000 seconds.

Referring to a block 950 of FIG. 9, the image forming apparatus 100 may obtain y=0.0839x+246.51 as a fifth linear prediction model, based on toner data accumulated from 0 second to 150 seconds at a time of 150 seconds. The image forming apparatus 100 may calculate a fifth expected supply time required for the level of remaining toner to reach the target level of 350 ADC from the fifth linear prediction model. The fifth expected supply time may be approximately 1800 seconds.

At an interval of 30 seconds, the expected supply time is predicted to be −382 seconds at the time of 30 seconds, 263 seconds at the time of 60 seconds, 5100 seconds at the time of 90 seconds, −5000 seconds at the time of 120 seconds, and 1800 seconds at the time of 150 seconds. The expected supply time at the time other than the time of 60 seconds does not satisfy a range of the reference supply time shown in FIG. 8. Also, because the slope of the first order linear model at the time of 30 seconds and 120 seconds is a negative number, a criteria for supplying the toner is not satisfied.

Referring to FIG. 9, because in the first linear prediction model, the slope is a negative number and the first expected supply time is a negative number, the image forming apparatus 100 may stop the operation of supplying the toner to the developing apparatus 1010 at the time of 30 seconds. The image forming apparatus 100 may perform the operation of supplying the toner to the developing apparatus 1010 for only 30 seconds without performing the operation for 150 seconds.

The image forming apparatus 100 may predict the expected supply time required for the amount of remaining toner to reach the target level every predetermined period such that image forming apparatus 100 may determine whether the level of the amount of remaining toner may not reach the target level at a time earlier than the maximum supply time and reduce an unnecessary operation in the image forming apparatus 100. Also, a waiting time of a user may be reduced.

Figure 10:
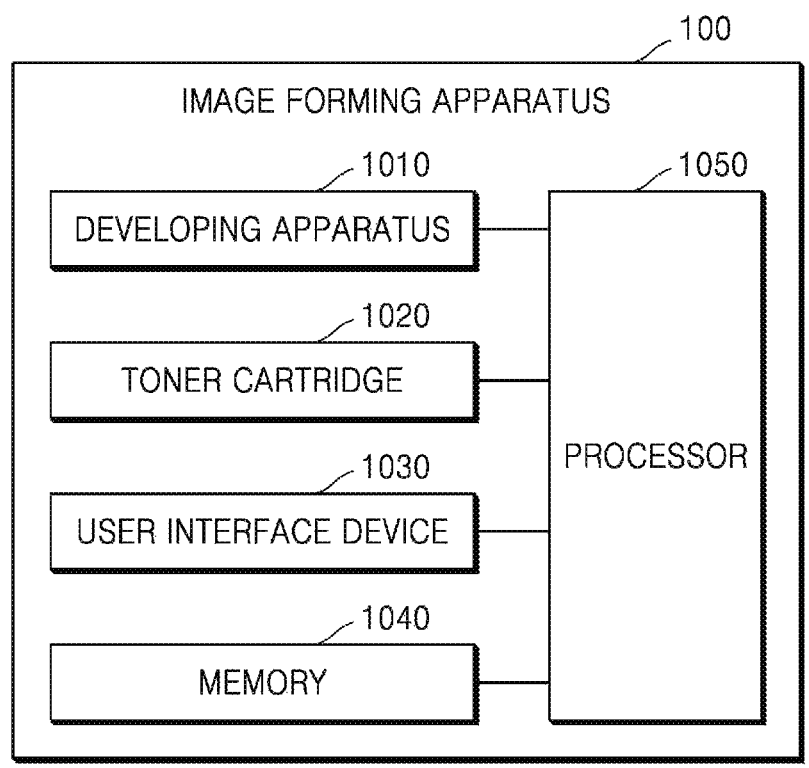
FIG. 10 is a block diagram showing a structure of an image forming apparatus, according to an example.

FIG. 10 is a block diagram showing a structure of an image forming apparatus, according to an example.

Referring to FIG. 10, the image forming apparatus 100 shown in FIG. 10 may include the developing apparatus 1010, the toner cartridge 1020, a user interface device 1030, a memory 1040, and a processor 1050. However, the illustrated components are not indispensable components. The image forming apparatus 100 may be implemented to include more components than the illustrated components, and the image forming apparatus 100 may be implemented to include fewer components than the illustrated components. Hereinafter, the components will be described.

The developing apparatus 1010 may rotatably support a developing roller to supply toner to a photoconductor. The developing apparatus 1010 may include a sensor that senses an amount of toner in the developing apparatus 1010. The toner cartridge 1020 may be mounted on the image forming apparatus 100 and may supply the toner in the toner cartridge 1020 to the developing apparatus 1010. The processor 1050 may control the toner cartridge 1020 and the developing apparatus 1010 such that the toner in the toner cartridge 1020 may be supplied to the developing apparatus 1010.

The user interface device 1030 may include an input unit for receiving an input or the like for controlling an operation of the image forming apparatus 100 from a user and an output unit for displaying information such as a result of the operation of the image forming apparatus 100 or a state of the image forming apparatus 100, etc. For example, the user interface device 1030 may include an operation panel for receiving a user input, a display panel for displaying a screen, and the like.

For example, the input may include devices capable of receiving various types of user input, such as, a keyboard, a physical button, a touch screen, a camera, a microphone, etc. Further, the output unit may include, for example, a display panel, a speaker, etc. However, the present disclosure is not limited thereto. The user interface device 1030 may include various input and output support devices.

The memory 1040 may store programs, data, or files related to the image forming apparatus 100. The processor 1050 may execute the programs stored in the memory 1040, read the data or the files stored in the memory 1040, or store a new file in the memory 1040. The memory 1040 may store program instructions, data files, data structures, etc., alone or in combination. The memory 1040 may store instructions executable by the processor 1050.

The memory 1040 may store toner data obtained from the sensor. Also, the memory 1040 may store a linear prediction model obtained at a predetermined interval, an expected supply time predicted from the linear prediction model, and a reference supply time. Further, the memory 1040 may store a program for controlling supply of the toner in the image forming apparatus 100 using a linear prediction analysis.

The processor 1050 may control the overall operation of the image forming apparatus 100 and may include at least one processor such as a CPU or the like. The processor 1050 may include at least one specialized processor corresponding to each function, or may be one integrated processor.

The processor 1050 may obtain toner data corresponding to an amount of toner remaining in the developing apparatus 1010 through the sensor in the image forming apparatus 100.

The processor 1050 may obtain the linear prediction model based on the toner data every predetermined period. Here, the linear prediction model is a model for predicting the amount of toner remaining in the developing apparatus 1010 according to a time at which the toner is supplied to the developing apparatus 1010.

The processor 1050 may analyze a trend of toner supply from the toner data accumulated from a toner supply start point to an end point of a predetermined period. The processor 1050 may obtain the linear prediction model that predicts the amount of toner remaining in the developing apparatus 1010 according to a supply time of toner based on a result of analyzing the trend of the toner supply.

For example, the linear prediction model may be a first order linear function that calculates the amount of toner remaining in the developing apparatus 1010 over time.

On the other hand, the processor 1050 may determine the predetermined period and the maximum period of supplying the toner according to the predetermined period.

The processor 1050 may predict the expected supply time required for the amount of toner remaining in the developing apparatus 1010 to reach a target level, based on the linear prediction model.

The processor 1050 may control an operation of supplying the toner to the developing apparatus 1010 according to a result of comparing the expected supply time with the predetermined reference supply time.

For example, when the expected supply time is shorter than the reference supply time, the processor 1050 may control the toner cartridge 1020 and the developing apparatus 1010 to continue to perform the operation of supplying the toner to the developing apparatus 1010. For example, when an n-th expected supply time predicted from an n-th linear prediction model with respect to an n-th period is shorter than a reference supply time corresponding to the n-th period, the processor 1050 may continue to perform the operation of supplying the toner to the developing apparatus 1010 to a start point of an n+1th period. The processor 1050 may obtain an n+1th linear prediction model with respect to the n+1th period. The processor 1050 may predict an n+1th expected supply time required for the amount of toner remaining in the developing apparatus 1010 to reach the target level from n+1th linear prediction model. The processor 1050 may control the operation of supplying the toner to the developing apparatus 1010 according to a result of comparing the n+1th expected supply time with a reference supply time corresponding to the n+1th period.

On the other hand, when the amount of toner remaining in the developing apparatus 1010 reaches the target level as the toner is supplied to the developing apparatus 1010, the processor 1050 may control the toner cartridge 1020 and the developing apparatus 1010 to stop the operation of supplying the toner to the developing apparatus 1010.

For another example, when the expected supply time is longer than the reference supply time, the processor 1050 may control the toner cartridge 1020 and the developing apparatus 1010 to stop the operation of supplying the toner to the developing apparatus 1010. Also, the processor 1050 may stop an operation of an OPC in the image forming apparatus 100. Further, the processor 1050 may determine that an amount of toner in the toner cartridge 1020 mounted in the image forming apparatus 100 is in a low state. The processor 1050 may output a replacement notification of the toner cartridge 1020.

For example, the linear prediction model may be a first order linear function that calculates the amount of toner remaining in the developing apparatus 1010 over time. When a slope of the first order linear function is negative or when an expected supply time calculated from the first order linear function does not satisfy a range of the reference supply time, the processor 1050 may stop the operation of supplying the toner to the developing apparatus 1010.

For example, in case where there is a sufficient amount of toner to perform a predetermined image forming operation in the toner cartridge 1020 mounted in the image forming apparatus 100, when the expected supply time predicted from the linear prediction model is longer than the reference supply time, the processor 1050 may determine a state of the image forming apparatus 100 as a state in which a predetermined defect exists in the image forming apparatus 100. The processor 1050 may control the user interface device 1030 to display defect information of a position where the predetermined defect exists or a predetermined component in which the predetermined defect exists on the user interface device 1030.

The processor 1050 may set the reference supply time corresponding to each period such that the reference supply time corresponding to each period decreases from a first period for firstly predicting the expected supply time to the maximum period according to the maximum supply time.

On the other hand, the processor 1050 may receive a request for performing a predetermined image forming operation through the user interface device 1030 or may receive a request for performing a predetermined image forming operation from an external device through a communication device. In this case, the predetermined image forming operation may not be performed because the amount of toner remaining in the developing apparatus 1010 is lower than the target level. The processor 1050 may display state information of the image forming apparatus 100 with respect to at least one of a state in which the amount of toner in the toner cartridge 1020 mounted on the image forming apparatus 100 is low and a state in which the toner is supplied to the developing apparatus 1010, through the user interface device 1030.

The above-described method of operating the image forming apparatus may be embodied in form of a non-transitory computer-readable recording medium storing computer-executable instructions or data. The above-described examples may be written as computer programs and may be implemented in general-use digital computers that execute the programs using a non-transitory computer-readable recording medium. Examples of the non-transitory computer-readable recording medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk, a solid-state disk (SSD), and any device capable of storing machine readable instructions, related data, a data file, and data structures and providing the machine readable instructions, the related data, the data file, and the data structures to a processor or a computer such that the processor or the computer execute the instruction.

While the disclosure has been particularly shown and described with reference to examples thereof, it will be understood by those of ordinary skill in the art that various changes in form and details may be made therein without departing from the spirit and scope of the disclosure as defined by the following claims. In an example, an appropriate result may be attained even when the above-described techniques are performed in a different order from the above-described method, and/or components, such as the above-described system, structure, device, and circuit, are coupled or combined in a different form from the above-described methods or substituted for or replaced by other components or equivalents thereof.

What is claimed is:

1. An operating method of an image forming apparatus, the method comprising:
    obtaining, through a sensor in the image forming apparatus, toner data corresponding to an amount of toner remaining in a developing apparatus;
    predicting an amount of toner remaining in the developing apparatus according to a supply time of the toner, based on the obtained toner data;
    obtaining an expected supply time for the amount of toner remaining in the developing apparatus to reach a target level to maintain a density and quality of an image forming operation;

comparing the expected supply time with a reference supply time;

when the expected supply time is longer than the reference supply time, identifying whether an amount of toner in a toner cartridge is sufficient to perform the image forming operation; and based on the identified amount of toner in the toner cartridge being sufficient to perform the image forming operation, determining that a defect exists in the image forming apparatus.

2. The operating method of claim 1, wherein the predicting of the amount of toner remaining comprises:

analyzing a trend of a toner supply from the toner data accumulated from a toner supply start point to an end point of a period; and based on a result of the analyzing, predicting the amount of toner remaining in the developing apparatus according to the supply time of the toner.

3. The operating method of claim 2, wherein a linear prediction model is used for predicting the amount of toner remaining, wherein the linear prediction model is a first order linear function for calculating the amount of toner remaining in the developing apparatus over time, and wherein the operating method further comprises stopping an operation of supplying the toner to the developing apparatus based on a slope of the first order linear function being a negative value or based on the expected supply time calculated via the first order linear function not satisfying a range of the reference supply time.

4. The operating method of claim 1, further comprising:

supplying the toner to the developing apparatus based on the expected supply time being shorter than the reference supply time; and stopping the supplying of the toner to the developing apparatus based on the expected supply time being longer than the reference supply time.

5. The operating method of claim 4, wherein the supplying of the toner to the developing apparatus based on the expected supply time being shorter than the reference supply time comprises:

based on an n-th expected supply time predicted from an n-th linear prediction model with respect to an n-th period being shorter than a reference supply time corresponding to the n-th period, continuing to perform the operation of supplying the toner to the developing apparatus to a start point of an n+1 th period; and obtaining an n+1th linear prediction model with respect to the n+1 th period, and controlling the operation of supplying the toner to the developing apparatus according to a result of comparing an n+1 th expected supply time predicted from the n+1 th linear prediction model with a reference supply time corresponding to the n+1 th period.

6. The operating method of claim 4, wherein the supplying of the toner to the developing apparatus based on the expected supply time being shorter than the reference supply time comprises stopping the supplying of the toner to the developing apparatus based on the amount of toner remaining in the developing apparatus reaching the target level as the toner is supplied to the developing apparatus.

7. The operating method of claim 4, wherein the stopping of the supplying of the toner to the developing apparatus based on the expected supply time being longer than the reference supply time comprises:

stopping an operation of an organic photoconductor (OPC) in the image forming apparatus;

determining that the amount of toner in the toner cartridge mounted on the image forming apparatus is at a low level; and outputting a replacement notification of the toner cartridge.

8. The operating method of claim 1, further comprising:

outputting defect information of a position where the defect exists or a component in which the defect exists.

9. The operating method of claim 1, further comprising:

determining a period and a maximum period for supplying the toner according to the period; and setting a reference supply time corresponding to each period such that a reference supply time corresponding to each period decreases from a first period to the maximum period.

10. The operating method of claim 1, further comprising:

receiving a request for performing the image forming operation from the image forming apparatus or an external apparatus; and based on the image forming operation not being performed because the amount of toner remaining in the developing apparatus is lower than the target level, displaying state information of the image forming apparatus with respect to at least one of a state in which the amount of toner in the toner cartridge mounted on the image forming apparatus is low or a state in which the toner is supplied to the developing apparatus.

11. A non-transitory computer readable storage medium including instructions for operating an image forming apparatus, the non-transitory computer readable storage medium comprising:

instructions to obtain toner data corresponding to an amount of toner remaining in a developing apparatus through a sensor in the image forming apparatus;

instructions to predict an amount of toner remaining in the developing apparatus according to a supply time of the toner, based on the obtained toner data;

instructions to predict an expected supply time for the amount of toner remaining in the developing apparatus to reach a target level to maintain a density and quality of an image forming operation;

instructions to compare the expected supply time with a reference supply time;

instructions to, when the expected supply time is longer than the reference supply time, identify whether an amount of toner in a toner cartridge is sufficient to perform the image forming operation; and instructions to, based on the identified amount of toner in the toner cartridge being sufficient to perform the image forming operation, determine that a defect exists in the image forming apparatus.

12. An image forming apparatus comprising;

a developing apparatus to rotatably support a developing roller to supply toner to a photoconductor and comprising a sensor for sensing an amount of toner;

a toner cartridge, mounted in the image forming apparatus, to supply the toner to the developing apparatus;

a user interface device;

a processor; and a memory storing instructions executable by the processor, wherein the processor is to execute the instructions to:

obtain toner data, through the sensor, corresponding to an amount of toner remaining in the developing apparatus;

predict an amount of toner remaining in the developing apparatus according to a supply time of the toner, based on the obtained toner data;

predict, an expected supply time for the amount of toner remaining in the developing apparatus to reach a target level to maintain a density and quality of an image forming operation;

compare the expected supply time with a reference supply time;

when the expected supply time is longer than the reference supply time, identify whether an amount of toner in a toner cartridge is sufficient to perform the image forming operation; and based on the identified amount of toner in the toner cartridge being sufficient to perform the image forming operation, determine that a defect exists in the image forming apparatus.

13. The image forming apparatus of claim 12, wherein the processor, by executing the instructions, is to:

analyze a trend of a toner supply from the toner data accumulated from a toner supply start point to an end point of a period, and based on a result of analysis, predict the amount of toner remaining in the developing apparatus according to a supply time of the toner.

14. The image forming apparatus of claim 12, wherein a linear prediction model is used for predicting the amount of toner remaining, wherein the linear prediction model is a first order linear function for calculating the amount of toner remaining in the developing apparatus over time, and wherein the processor, by executing the instructions, is to stop an operation of supplying the toner to the developing apparatus based on a slope of the first order linear function being a negative value or based on the expected supply time calculated from the first order linear function not satisfying a range of the reference supply time.

15. The image forming apparatus of claim 12, wherein the processor, by executing the instructions, is to:

output defect information of a position where the defect exists or a component in which the defect exists.

16. The image forming apparatus of claim 12, wherein the processor, by executing the instructions, is to:

supply the toner to the developing apparatus based on the expected supply time being shorter than the reference supply time; and stop the supplying of the toner to the developing apparatus based on the expected supply time being longer than the reference supply time.

17. The image forming apparatus of claim 16, wherein the processor, by executing the instructions to supply the toner to the developing apparatus based on the expected supply time being shorter than the reference supply time, is to:

based on an n-th expected supply time predicted from an n-th linear prediction model with respect to an n-th period being shorter than a reference supply time corresponding to the n-th period, continue to perform the operation of supplying the toner to the developing apparatus to a start point of an n+1 th period; and obtain an n+1th linear prediction model with respect to the n+1 th period, and control the operation of supplying the toner to the developing apparatus according to a result of comparing an n+1 th expected supply time predicted from the n+1 th linear prediction model with a reference supply time corresponding to the n+1 th period.

18. The image forming apparatus of claim 16, wherein the processor, by executing the instructions to supply the toner to the developing apparatus based on the expected supply time being shorter than the reference supply time, is to stop the supplying of the toner to the developing apparatus based on the amount of toner remaining in the developing apparatus reaching the target level as the toner is supplied to the developing apparatus.

19. The image forming apparatus of claim 16, wherein the processor, by executing the instructions to stop the supplying of the toner to the developing apparatus based on the expected supply time being longer than the reference supply time, is to:

stop an operation of an organic photoconductor (OPC) in the image forming apparatus;

identify that the amount of toner in the toner cartridge mounted on the image forming apparatus is at a low level; and output a replacement notification of the toner cartridge.

20. The image forming apparatus of claim 12, wherein the processor, by executing the instructions, is to:

receive a request for performing the image forming operation from the image forming apparatus or an external apparatus; and based on the image forming operation not being performed because the amount of toner remaining in the developing apparatus is lower than the target level, display state information of the image forming apparatus with respect to at least one of a state in which the amount of toner in the toner cartridge mounted on the image forming apparatus is low or a state in which the toner is supplied to the developing apparatus.

* * * * *